United States Patent
Zhang et al.

(10) Patent No.: US 10,602,250 B2
(45) Date of Patent: Mar. 24, 2020

(54) ACOUSTAICAL DEVICES EMPLOYING PHASE CHANGE MATERIALS

(71) Applicant: Bose Corporation, Framingham, MA (US)

(72) Inventors: Han Zhang, Shrewsbury, MA (US); Shawn J. Prevoir, Northborough, MA (US); Eric M. Wallace, Andover, MA (US)

(73) Assignee: Bose Corporation, Framingham, MA (US)

( * ) Notice: Subject to any disclaimer, the term of this patent is extended or adjusted under 35 U.S.C. 154(b) by 198 days.

(21) Appl. No.: 15/292,345

(22) Filed: Oct. 13, 2016

(65) Prior Publication Data

US 2018/0109858 A1    Apr. 19, 2018

(51) Int. Cl.
| | |
|---|---|
| H04R 25/00 | (2006.01) |
| H04R 1/02 | (2006.01) |
| H04R 1/10 | (2006.01) |
| C09K 5/06 | (2006.01) |
| H04R 5/033 | (2006.01) |

(52) U.S. Cl.
CPC ............ H04R 1/026 (2013.01); C09K 5/063 (2013.01); H04R 1/1091 (2013.01); H04R 1/1008 (2013.01); H04R 5/0335 (2013.01); H04R 2201/105 (2013.01)

(58) Field of Classification Search
CPC .......... H04R 25/00; H04R 1/10; H04R 1/026
USPC ....... 181/129; 381/370, 374, 381; 427/126.3
See application file for complete search history.

(56) References Cited

U.S. PATENT DOCUMENTS

| | | | |
|---|---|---|---|
| 4,989,271 A * | 2/1991 | Sapiejewski | A61F 11/14 2/209 |
| 6,099,894 A * | 8/2000 | Holman | B01J 13/02 427/126.3 |
| 6,295,366 B1 | 9/2001 | Haller | |
| 6,319,599 B1 | 11/2001 | Buckely | |
| 6,856,690 B1 * | 2/2005 | Skulley | H04R 1/1008 381/367 |
| 7,703,572 B2 | 4/2010 | Du | |
| D645,458 S | 9/2011 | Silvestri et al. | |
| RE43,939 E | 1/2013 | Sapiejewski et al. | |
| 8,355,522 B2 | 1/2013 | Annunziato | |
| 8,374,373 B2 | 2/2013 | Sapiejewski et al. | |
| 8,746,397 B2 | 6/2014 | Peskar et al. | |
| 9,462,366 B2 | 10/2016 | Silvestri et al. | |
| D794,613 S | 8/2017 | Hayden | |
| 9,744,074 B2 | 8/2017 | Rogers | |

(Continued)

FOREIGN PATENT DOCUMENTS

| | | |
|---|---|---|
| EP | 2 709 379 | 3/2014 |
| JP | 2001 309478 | 11/2001 |

(Continued)

OTHER PUBLICATIONS

International Search Report & Written Opinion; PCT/US2017/056058; dated Dec. 7, 2017; 14 pages.

(Continued)

*Primary Examiner* — Phylesha Dabney
(74) *Attorney, Agent, or Firm* — Fish & Richardson P.C.

(57) ABSTRACT

The disclosure is related to materials that includes phase change materials. The materials are suitable for use in acoustical devices such as headphones.

27 Claims, 3 Drawing Sheets

(56) References Cited

U.S. PATENT DOCUMENTS

| | | |
|---|---|---|
| 2002/0013212 A1 | 1/2002 | Boussant-Roux et al. |
| 2003/0078471 A1 | 4/2003 | Foley et al. |
| 2004/0143153 A1 | 7/2004 | Sharrow |
| 2004/0230090 A1 | 11/2004 | Hegde et al. |
| 2004/0265495 A1 | 12/2004 | Freuler et al. |
| 2005/0089185 A1 | 4/2005 | Allen |
| 2006/0233986 A1 | 10/2006 | Gutsche et al. |
| 2006/0238593 A1 | 10/2006 | Kohne et al. |
| 2006/0276334 A1 | 12/2006 | Balduf et al. |
| 2007/0089276 A1 | 4/2007 | Dugan et al. |
| 2008/0145663 A1 | 6/2008 | Amundson et al. |
| 2008/0146890 A1 | 6/2008 | LeBoeur |
| 2008/0193653 A1 | 8/2008 | Oh |
| 2008/0230373 A1 | 9/2008 | Kim et al. |
| 2008/0247561 A1 | 10/2008 | Smith |
| 2009/0024143 A1 | 1/2009 | Crews et al. |
| 2010/0119076 A1* | 5/2010 | Monk ............... A61F 11/14 381/71.6 |
| 2010/0158301 A1* | 6/2010 | Kuhtz ............... H04R 1/1008 381/374 |
| 2010/0215198 A1 | 8/2010 | Ngia et al. |
| 2010/0280529 A1 | 11/2010 | Crews et al. |
| 2011/0002475 A1* | 1/2011 | Kimura ............... H04R 1/1008 381/71.6 |
| 2011/0072685 A1 | 3/2011 | Gutowsky, Jr. et al. |
| 2011/0125238 A1 | 5/2011 | Nofzinger |
| 2011/0193008 A1 | 8/2011 | Fieback et al. |
| 2011/0313498 A1 | 12/2011 | Rogers |
| 2012/0294465 A1 | 11/2012 | Vlach et al. |
| 2012/0316624 A1 | 12/2012 | Smith |
| 2013/0087404 A1 | 4/2013 | Peskar et al. |
| 2013/0123919 A1 | 5/2013 | Goldstein et al. |
| 2013/0136704 A1 | 5/2013 | Komatsuki et al. |
| 2013/0238065 A1 | 9/2013 | Rao |
| 2013/0296449 A1 | 11/2013 | Peterson et al. |
| 2013/0298991 A1 | 11/2013 | Parker et al. |
| 2013/0310907 A1 | 11/2013 | Rogers |
| 2014/0079270 A1* | 3/2014 | Essabar ............... H04R 1/1008 381/370 |
| 2014/0349075 A1 | 11/2014 | Hendriks et al. |
| 2015/0013682 A1 | 1/2015 | Hendriks et al. |
| 2015/0036861 A1 | 2/2015 | Cotha |
| 2015/0272850 A1 | 10/2015 | Yoneto et al. |
| 2015/0358712 A1* | 12/2015 | Ji ............... A61F 11/14 181/129 |
| 2016/0021449 A1 | 1/2016 | Litovsky et al. |
| 2016/0120474 A1 | 5/2016 | Connor |
| 2016/0123009 A1 | 5/2016 | Ayambem |
| 2016/0168439 A1 | 6/2016 | Ayambem |
| 2016/0200882 A1 | 7/2016 | Bhat |
| 2016/0223269 A1 | 8/2016 | Hartmann et al. |
| 2016/0230000 A1 | 8/2016 | Gu |
| 2017/0211992 A1 | 7/2017 | Yeager et al. |
| 2017/0226395 A1 | 8/2017 | Sutterlin et al. |
| 2017/0252534 A1 | 9/2017 | Nofzinger |
| 2018/0054667 A1 | 2/2018 | Yamkovoy |
| 2019/0169111 A1 | 6/2019 | Dickerson |

FOREIGN PATENT DOCUMENTS

| | | |
|---|---|---|
| WO | WO 1993/25053 | 12/1993 |
| WO | WO 2007/027670 | 3/2007 |
| WO | WO 2013/016336 | 1/2013 |
| WO | WO 2016/011063 | 1/2016 |
| WO | WO 2016/130631 | 8/2016 |

OTHER PUBLICATIONS

International Search Report & Written Opinion; PCT/US2017/056051; dated Jan. 17, 2018; 14 pages.

* cited by examiner

ACOUSTAICAL DEVICES EMPLOYING PHASE CHANGE MATERIALS

TECHNICAL FIELD

This disclosure generally relates to acoustical devices made from phase change materials

BACKGROUND

Acoustical devices are useful to deliver audible sounds to the ears.

SUMMARY

In one aspect, described herein are examples of acoustical devices including a headphone having a cushion that includes an outer layer configured to contact a headphone user; two or more phase change materials with an ability to change from solid phase to liquid phase or from one solid phase to a different solid phase at a predetermined phase-change temperature, wherein each phase change material has a different predetermined phase-change temperature; and padding; wherein the phase change materials are between the outer layer and the padding. The two or more phase change materials may be configured as two or more layers, and each layer of phase change material may have a different predetermined phase-change temperature. The phase-change temperatures of all of the two or more layers may be from about 25° C. to about 35° C. In some implementations, a first layer of the two or more layers having a phase change material is located between the outer layer and a second layer of the two or more layers, and the second layer is located between the first layer and the padding. The phase-change temperature of the first layer may be greater than the phase-change temperature of the second layer. The phase-change temperature of the first layer may be about 30° C. to about 35° C. The phase-change temperature of the second layer may be about 25° C. to about 32° C. or about 25° C. to about 29° C. The phase-change temperature of the first layer may be about 33° C. and the second layer may be about 27° C. The phase change material may include one or more compounds enclosed in microspheres. The compound may be a saturated hydrocarbon, a fatty acid, a polyether, a polyalcohol, a polyalcohol derivative, etc. The compound may be a saturated hydrocarbon. The compound may be an n-alkane. The compound may be n-hexadecane, n-octadecane, or n-nonadecane.

In one aspect, described herein are examples of acoustical devices including a loop-shaped structure for wearing around a user's neck, wherein the loop-shaped structure includes a cushion including an outer layer configured to contact an acoustical device user; two or more phase change materials with an ability to change from solid phase to liquid phase or from one solid phase to a different solid phase at a predetermined phase-change temperature, wherein each phase change material has a different predetermined phase-change temperature; and padding; wherein the phase change materials are between the outer layer and the padding. The two or more phase change materials may be configured as two or more layers, and each layer of phase change material has a different predetermined phase-change temperature. The phase-change temperatures of all of the layers having phase change material may be from about 25° C. to about 35° C. In some examples, a first layer of the two or more layers having a phase change material is located between the outer layer and a second layer of the two or more layers, and the second layer is located between the first layer and the padding. The phase-change temperature of the first layer may be greater than the phase-change temperature of the second layer. The phase-change temperature of the first layer may be about 30° C. to about 35° C. The phase-change temperature of the second layer may be about 25° C. to about 32° C. or about 25° C. to about 29° C. The phase-change temperature of the first layer may be about 33° C. and the second layer is about 27° C. The phase change material may include one or more compounds enclosed in microspheres.

In one aspect, described herein are examples of acoustical devices including a loop-shaped structure for wearing around a user's neck, wherein the loop-shaped structure includes a composition including an elastomer or textile; and one or more phase change material with an ability to change from solid phase to liquid phase or from one solid phase to a different solid phase at a predetermined phase-change temperature. The predetermined temperature may be about 25° C. to about 35° C. The elastomer may be thermoset rubber, thermoplastic elastomer, or a combination thereof. The elastomer may be thermoplastic polyurethanes (TPUs), styrenic-based thermoplastic elastomers, thermoplastic vulcanizates (TPV), thermoset rubbers, or a combination thereof. The phase change material may include one or more compounds enclosed in microspheres.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

DETAILED DESCRIPTION

Figure 1:
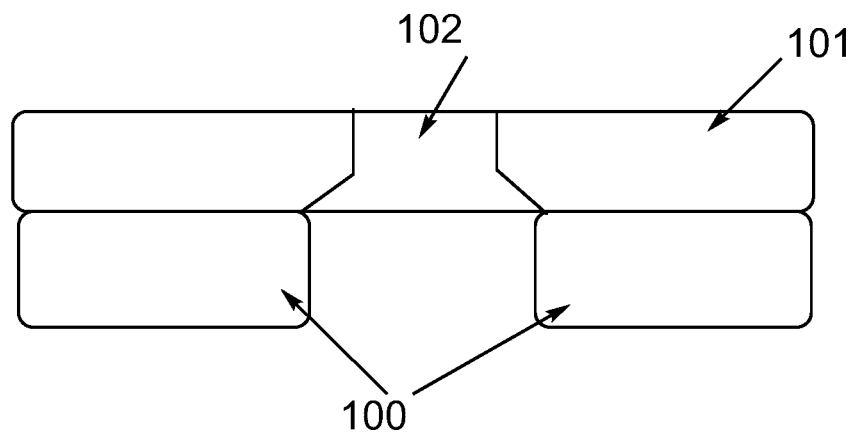
FIG. 1 shows a cross sectional view of an exemplary headphone.
Figure 2:
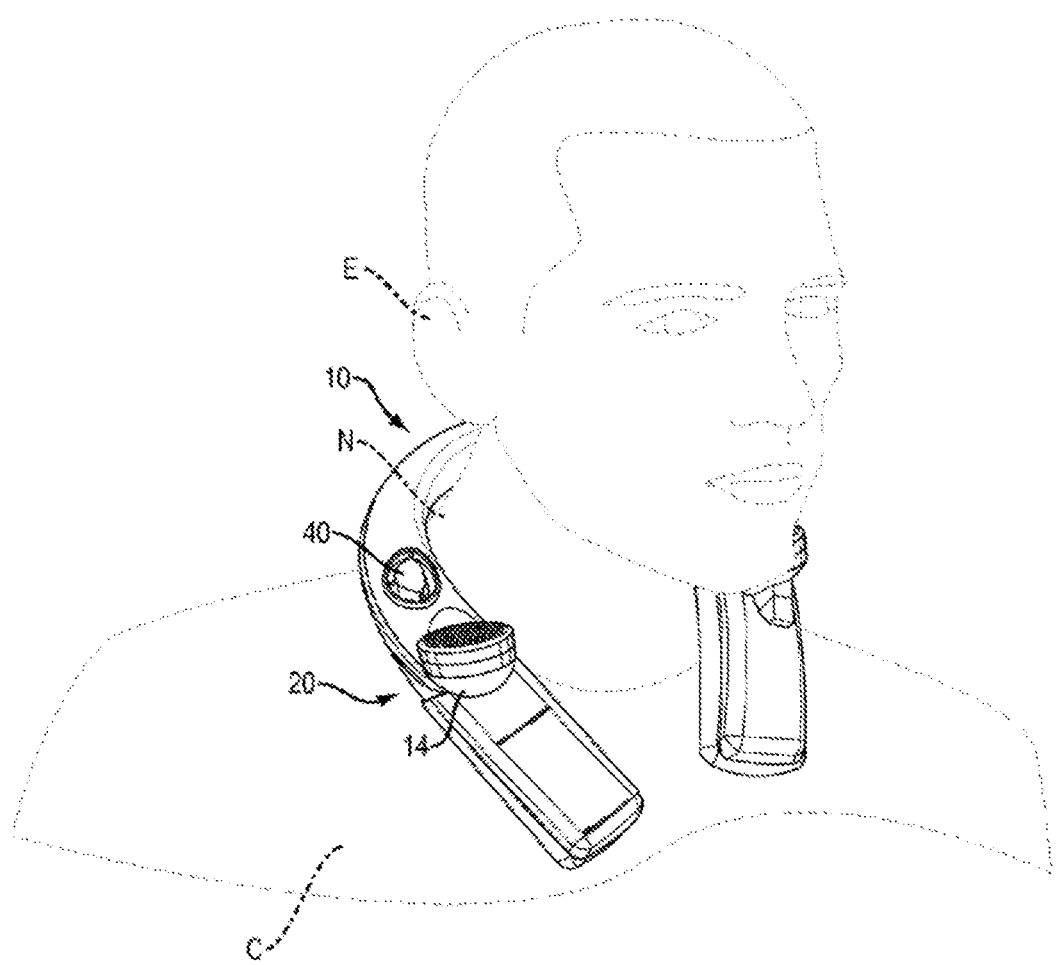
FIG. 2 shows a top perspective view of an exemplary neck loop acoustical device being worn by a user.

The present disclosure describes materials that are useful for preparing acoustical devices such as headphones and neck loop acoustical devices shown in FIG. 1 and FIG. 2. Typically, a headphone that covers or rests on the ear of a user includes a cushion attached to an ear cup and a speaker that provides the sound to the user. FIG. 1 provides an exemplary headphone showing the cushion 100, ear cup 101, and a speaker 102 that produces sound waves. FIG. 2 shows an example of an acoustical device in a horseshoe-shaped neck loop 10. The neck loop generally curves around the nape of the user's neck N and has a pair of legs 20 which drape over the upper torso on either side of the neck, near the clavicle C. The wave guide outlets 40 and acoustic drivers 14 sit on top of the legs. The acoustic drivers are below the expected location of the ears E.

This disclosure provides materials that are useful for use in acoustical devices. The materials can include one or more phase change materials, which can absorb heat as temperature rises by consuming the heat energy to melt a solid to liquid or to transform a solid from one solid phase to a different solid phase. The result of this is that the material or system stays at a constant temperature until the completion of the phase transition (solid to liquid or one solid phase to another solid phase). This in turn slows the rate of increase in temperature of the object providing the heat energy to the phase change material, i.e., the user's skin. As the external temperature cools, the phase change material releases the heat and changes back to a solid or to the original solid phase. The phase change material can regulate a user's temperature and thus, reduce the discomfort due to heat and pressure that may arise from the presence of the acoustical device in contact with the user's skin. Acoustical devices having one or more of their components made from phase change materials can provide improved comfort. In previous uses of phase change materials to improve user's comfort, the melting point of the phase change material (or the phase transition temperature) is kept as low as possible, such as below about 25° C. However, one disadvantage is that such phase change material may be able to keep the device at such a low temperature only for a short period of time due to high temperature gradient between the skin and the device, resulting more heat transfer from the human body to the device through the contact area. This quickly passes the melting point (or phase transition temperature), above which the phase change material no longer helps regulate temperature. In some implementations, the materials provided herein can maintain a lasting comfort by prolonging the cooling sensation.

Provided herein are examples of acoustical devices such as headphones having a cushion that includes an outer layer configured to contact a headphone user, two or more phase change materials, where each phase change material has a different phase-change temperature, and a layer of padding. The two or more phase change materials are between the outer layer and the padding. The phase-change temperature can be from about 25° C. to about 35° C.

In some examples, the outer layer of the cushion is made from leather or fabric. The outer layer may also be synthetic leather or plastic. The padding can be made from silicone gel (e.g., high-density silicone gel and silicone gel compounded with tungsten), foam (e.g., open cell foam), or a combination thereof. The cushion may include an attachment section, which is typically stiff or rigid, and mates with an attachment feature on the ear cup. Examples include a ring that is trapped under tabs on the ear cup, a flange that fits around a mating flange on the ear cup, or a plastic plate with holes or pegs that snap onto complementary features on the ear cup. In other examples, the attachment mechanism is entirely on the ear cup and captures the cushion, or the cushion is simply attached to the ear cup using adhesive.

Figure 3:
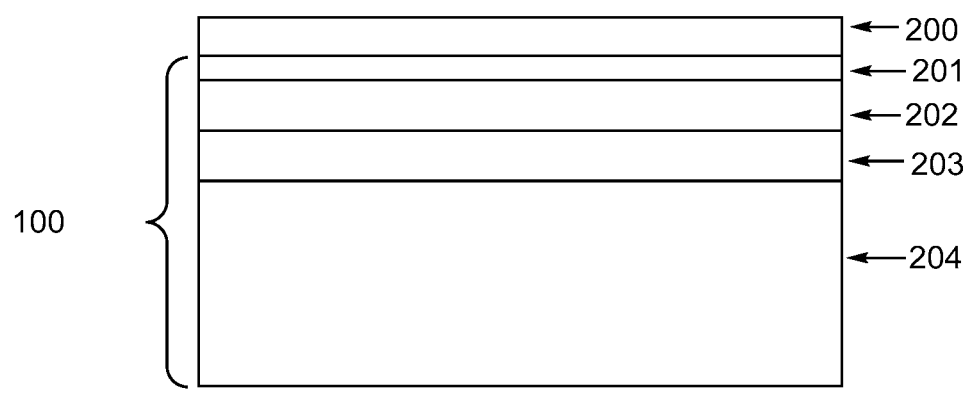
FIG. 3 shows a cross sectional view of the arrangement of the material in an exemplary cushion relative to the user's skin or clothing.

The phase change materials described herein can be formed into layers, e.g., two or more layers, each layer with a phase change material having a different phase-change temperature. In some examples, phase change materials can be formed into layers and the phase change material in these layers can have the same phase-change temperature. For example, a first layer of the two or more layers having a phase change material can be located between the outer layer and a second layer of the two or more layers, and the second layer can be located between the first layer and the padding. See FIG. 3, which shows a user's skin or clothing 200 and cushion 100 including the outer layer 201, first layer of phase change material 202, second layer of phase change material 203, and padding 204. In some examples, the phase-change temperature of the first layer is greater than the phase-change temperature of the second layer. For example, the phase-change temperature of the first layer is about 30° C. to about 35° C. The phase-change temperature of the second layer can be about 25° C. to about 32° C. or about 25° C. to about 29° C. The phase-change temperature of the first layer can be about 33° C. and the second layer can be about 27° C. or about 30° C. by blending different types of phase change materials. The cushion can have more than two layers, for example, it can include three, four, or five layers, each with a phase change material that has a different phase-change temperature. For example, in a cushion including three layers: the first layer (which is closer to the user's skin or clothing) can include phase change material with a phase-change temperature of about 33° C. to about 35° C., the second layer (which is between the first layer and the third layer) can include phase change material with a phase-change temperature of about 32° C. to about 30° C., and the third layer (which is between the second layer and the padding) can include phase change material with a phase-change temperature of about 25° C. to about 29° C. In some examples, the padding also includes phase change material, with yet another phase-change temperature, lower than the last layer in contact with it.

The phase change material can be present e.g., in each of the two or more layers in the amount of about 10% to about 80%, about 20% to about 60%, or about 40% to about 50% by weight.

The phase change material can include one or more compounds enclosed in microspheres. Examples of such compounds include saturated hydrocarbons (e.g., n-alkane), fatty acids (e.g., carboxylic acid with an aliphatic chain), polyethers, polyalcohols, polyalcohol derivatives (e.g., PG-NPG, PE-NPG, etc.), etc. For instance, the compound can be a saturated hydrocarbon such as n-alkane. Examples of n-alkanes include, but not limited to, compounds having fourteen carbons to forty carbons or fourteen to thirty-two carbons in chain length, e.g., tetradecane (melting point (mp) at about 5.5° C.), pentadecane (mp at about 9.9° C.), hexadecane (mp at about 18° C.), heptadecane (mp at about 21° C.), octadecane (mp at about 29° C.), nonadecane (mp at about 33° C.), icosane (mp at about 36.7° C.), henicosane (mp at about 40.5° C.), docosane (mp at about 42° C.), tricosane (mp at about 49° C.), tetracosane (mp at about 52° C.), pentacosane (mp at about 54° C.), hexacosane (mp at about 56.4° C.), heptacosane (mp at about 59.5° C.), octacosane (mp at about 64.5° C.), nonacosane (mp at about 63.7° C.), triacontane (mp at about 65.8° C.), hentriacontane (mp at about 67.9° C.), and dotriacontane (mp at about 69° C.). In some examples, the compound is n-hexadecane, n-octadecane, or n-nonadecane. The amount of compound in the phase change material can be greater than about 50%, about 60%, about 70%, about 80%, about 90%, or about 95% by weight. An exemplary phase change material that has a melting point of about 28° C. includes about 3% of water, about 0.05% of formaldehyde, about 85% to about 90% of octadecane and about 10% to about 15% of shells enclosing these compounds. Another example of phase change material that has a melting point of about 32° C. includes about 3% of water, about 0.5% of formaldehyde, about 42% to about 45% of octadecane, about 42% to about 45% of eicosane, and about 10% to about 15% of shells enclosing these compounds.

Examples of phase change material include those described in the table below from Outlast Technologies LLC (Golden, Colorado):

TABLE 1

| Product ID | Construction | Width (cm) | Weight (g/m2) | Phase change temperature |
|---|---|---|---|---|
| Tubiscreen VP 1299/11 | Spray compound | NA | NA | NA |
| TX PMC 28 | Powder | NA | NA | 27° C. |
| L2980-11 | 3-layer | 150 | 315 +/− 5% | 27 to 34° C. |
| L2422-17 | 2-layer | 148 | 210 +/− 5% | 27 to 30° C. |
| L2505-17 | 3-layer | 148 | 220 +/− 5% | 27 to 34° C. |

Other examples of phase change material include MPCM28C (melting point 28° C.) and MPCM32D (melting point 32° C.) from Microtek Laboratories, Inc. (Dayton, Ohio) and Enfinit PCM 35 powder (melting point 35° C.) from Encapsys LLC (Appleton, Wis.).

In some implementations, the two or more phase change materials, each with a different phase-change temperature, can be blended together rather than in separate layers. In such an example, the acoustical device includes a headphone having a cushion, which includes an outer layer configured to contact a headphone user, the two or more phase change materials having different phase-change temperatures, and the padding. The phase change materials are between the outer layer and the padding. Various ratios of two or more phase change materials can be blended. In an example where two phase change materials are blended, the ratio of the phase change material that has a melting point (or phase transition temperature) of about 30° C. to about 35° C. and of about 25° C. to about 29° C. can vary, e.g., from about 10:1 to about 1:10. In an example where three phase change materials are blended, the ratio of the material having a melting point (or phase transition temperature) of (1) about 33° C. to about 35° C., (2) about 30° C. to about 32° C., and (3) about 25° C. to about 29° C. can also vary.

In some examples, the phase change material can be in powder form, which includes microspheres that have a hard shell (e.g., acrylate) and one of more compounds enclosed inside the shell. The powder can be printed on textile (such as synthetic textiles or natural textiles such as cotton, silk, genuine leather, etc.) or polymer substrates (such as polyester or foam), infused in fibers, woven into cloth, or mixed with polymers to form into the desired shape for use. In some examples, the surface of the acoustical devices can be wrapped in cloth or fabric which includes phase change materials.

The phase change material can also be blended in a gel or an elastomer. The elastomer can be a thermoset rubber, thermoplastic elastomer, etc., or a combination thereof. Examples of elastomer include thermoplastic polyurethanes (TPUs), styrenic-based thermoplastic elastomers, thermoplastic vulcanizates (TPV) and thermoset rubbers, such as silicone, butyl, polyurethane, polynorbornene, nitrile, EPDM (ethylene propylene diene monomer (M-class) rubber), etc., or a combination thereof. In certain implementations, the silicone rubber is a liquid injection molding silicone such as KE-1950-10A from Shin-Etsu Silicones of America, Inc. (Akron, Ohio). The elastomer can be the Dragon Skin® series available from Smooth-On, Inc. (Macungie, Pa.).

An elastomer having phase change material can be included in a cushion between the outer layer and the padding. The elastomer can be formed into layers, each with a different phase change material having a different predetermined temperature or can be used without layering. A gel having phase change material can be included in a cushion between the outer layer and the padding. The gel may be wrapped in a cloth or an elastomer to protect it from damage.

The cushion described herein can be useful for an acoustical device that has a loop-shaped structure for wearing around a user's neck (e.g., the neck loop as described above). For example, the loop-shaped structure can include a cushion having an outer layer configured to contact the user; two or more phase change materials with different phase-change temperatures; and padding, with the phase change material located between the outer layer and the padding. The phase-change temperature can be from about 25° C. to about 35° C. The phase change materials can be formed into layers, e.g., two or more layers. In some examples, the first layer having phase change material is located between the outer layer and the second layer having phase change material, and the second layer is located between the first layer and the padding. As in the headphone example, the phase-change temperature of the first layer can be greater than the phase-change temperature of the second layer. The phase-change temperature of the first layer can be about 30° C. to about 35° C. The phase-change temperature of the second layer can be about 25° C. to about 32° C. or about 25° C. to about 29° C. For example, the phase-change temperature of the first layer can be about 33° C. and the second layer can be about 27° C. The outer layer, the phase change material, and padding are similar to those described above.

The cushion having one or more phase change materials can be included to the loop-shaped acoustical device where it comes in contact with the user's skin or clothing, e.g., the back of the user's neck, the upper torso near the clavicle, etc. See e.g., FIG. 2. In some implementations, the two or more phase change materials, each with a different phase-change temperature, can be blended together rather than in separate layers.

As used herein, and unless otherwise specified, the term "about," when used in connection with a numeric value or range of values is to indicate that the value or range of values may deviate to an extent deemed reasonable to one of ordinary skill in the art. It is well known instrument variation and other factors can affect the numerical values. The term "about" is to accommodate these variations.

What is claimed is:

1. An acoustical device comprising:
   a headphone having a cushion comprising:
      an outer layer configured to contact a headphone user;
      two or more phase change materials with an ability to change from solid phase to liquid phase or from one solid phase to a different solid phase at a predetermined phase-change temperature, wherein the two or more phase change materials are configured as two or more layers, such that for any two adjacent layers, the layer located closer to the user's skin has a phase-change temperature greater than the phase-change temperature of the layer located further from the user's skin; and
      padding;
      wherein the phase change materials are between the outer layer and the padding; and the phase change materials comprises one or more saturated hydrocarbon, fatty acid, polyether, polyalcohol, or polyalcohol derivative.

2. The acoustical device of claim 1, wherein the phase-change temperatures of all of the two or more layers are from about 25° C. to about 35° C.

3. The acoustical device of claim 1, wherein the phase-change temperature of the layer located closer to the user's skin is about 30° C. to about 35° C.

4. The acoustical device of claim 1, wherein the phase-change temperature of the layer located further from the user's skin is about 25° C. to about 32° C. or about 25° C. to about 29° C.

5. The acoustical device of claim 1, wherein the phase-change temperature of the layer located closer to the user's skin is about 33° C. and the layer located further away from the user's skin is about 27° C.

6. The acoustic device of claim 1, wherein the phase change material comprises one or more saturated hydrocarbon, fatty acid, polyether, polyalcohol, or polyalcohol enclosed in microspheres.

7. The acoustical device of claim 6, wherein the compound is a saturated hydrocarbon.

8. The acoustical device of claim 6, wherein the compound is an n-alkane.

9. The acoustical device of claim 6, wherein the compound is n-hexadecane, n-octadecane, or n-nonadecane.

10. An acoustical device comprising:
a loop-shaped structure for wearing around a user's neck, wherein the loop-shaped structure includes a cushion comprising:
an outer layer configured to contact an acoustical device user;
two or more phase change materials with an ability to change from solid phase to liquid phase or from one solid phase to a different solid phase at a predetermined phase-change temperature, wherein each phase change material has a different predetermined phase-change temperature; and
padding;
wherein the phase change materials are between the outer layer and the padding.

11. The acoustical device of claim 10, wherein the two or more phase change materials are configured as two or more layers, and each layer of phase change material has a different predetermined phase-change temperature.

12. The acoustical device of claim 11, wherein the phase-change temperatures of all of the layers having phase change material are from about 25° C. to about 35° C.

13. The acoustical device of claim 11, wherein the two or more layers are configured such that for any two adjacent layers, the layer located closer to the user's skin or clothing has a phase change temperature greater than the phase-change temperature of the layer located further from the user's skin or clothing.

14. The acoustical device of claim 13, wherein the phase-change temperature of the layer located closer to the user's skin or clothing is greater than the phase-change temperature of the layer located further from the user's skin or clothing.

15. The acoustical device of claim 13, wherein the phase-change temperature of the layer located closer to the user's skin or clothing is about 30° C. to about 35° C.

16. The acoustical device of claim 13, wherein the phase-change temperature of the layer located further from the user's skin or clothing is about 25° C. to about 32° C. or about 25° C. to about 29° C.

17. The acoustical device of claim 13, wherein the phase-change temperature of the layer located closer to the user's skin or clothing is about 33° C. and the second layer is about 27° C.

18. The acoustical device of claim 10, wherein the phase change material comprises one or more compounds enclosed in microspheres.

19. The acoustical device of claim 18, wherein the compound is a saturated hydrocarbon, a fatty acid, a polyether, a polyalcohol, or a polyalcohol derivative.

20. The acoustical device of claim 19, wherein the compound is a saturated hydrocarbon.

21. The acoustical device of claim 19, wherein the compound is an n-alkane.

22. The acoustical device of claim 19, wherein the compound is n-hexadecane, n-octadecane, or n-nonadecane.

23. An acoustical device comprising:
a loop-shaped structure for wearing around a user's neck, wherein the loop-shaped structure includes a composition comprising:
an elastomer or textile; and
one or more phase change material with an ability to change from solid phase to liquid phase or from one solid phase to a different solid phase at a predetermined phase-change temperature.

24. The acoustical device of claim 23, wherein the predetermined temperature is about 25° C. to about 35° C.

25. The acoustical device of claim 23, wherein the elastomer is thermoset rubber, thermoplastic elastomer, or a combination thereof.

26. The acoustical device of claim 23, wherein the elastomer is thermoplastic polyurethanes (TPUs), styrenic-based thermoplastic elastomers, thermoplastic vulcanizates (TPV), thermoset rubbers, or a combination thereof.

27. The acoustical device of claim 23, wherein the phase change material comprises one or more compounds enclosed in microspheres.

* * * * *

UNITED STATES PATENT AND TRADEMARK OFFICE
CERTIFICATE OF CORRECTION

PATENT NO. : 10,602,250 B2  
APPLICATION NO. : 15/292345  
DATED : March 24, 2020  
INVENTOR(S) : Zhang et al.

Page 1 of 1

It is certified that error appears in the above-identified patent and that said Letters Patent is hereby corrected as shown below:

On the Title Page

Item (54) and in the Specification, Column 1, Line 1, delete "ACOUSTAICAL" and insert -- ACOUSTICAL --, therefor.

In the Claims

Column 7, Line 9, In Claim 6, delete "acoustic" and insert -- acoustical --, therefor.

Signed and Sealed this  
Twenty-sixth Day of May, 2020

Andrei Iancu  
*Director of the United States Patent and Trademark Office*